US010023767B2

(12) United States Patent
Huang et al.

(10) Patent No.: US 10,023,767 B2
(45) Date of Patent: Jul. 17, 2018

(54) ANCHORAGE ADDITIVE EMULSION FOR SILICONE RELEASE COATING COMPOSITION

(71) Applicants: Dow Corning Corporation, Midland, MI (US); Dow Corning (China) Holding Co., Ltd., Shanghai (CN)

(72) Inventors: Bruce Fuming Huang, Shanghai (CN); Chung Mien Kuo, Chungli (TW)

(73) Assignees: DOW SILICONES CORPORATION, Midland, MI (US); DOW (SHANGHAI) HOLDING CO., LTD., Shanghai (CN)

( * ) Notice: Subject to any disclaimer, the term of this patent is extended or adjusted under 35 U.S.C. 154(b) by 112 days.

(21) Appl. No.: 15/039,475

(22) PCT Filed: Nov. 26, 2014

(86) PCT No.: PCT/CN2014/092268
§ 371 (c)(1),
(2) Date: May 26, 2016

(87) PCT Pub. No.: WO2015/078373
PCT Pub. Date: Jun. 4, 2015

(65) Prior Publication Data
US 2016/0376475 A1    Dec. 29, 2016

(30) Foreign Application Priority Data
Nov. 26, 2013 (CN) .................. PCT/CN2013/087825

(51) Int. Cl.
| C08G 77/16 | (2006.01) |
| C09J 7/04 | (2006.01) |
| C08K 5/5435 | (2006.01) |
| C08L 83/06 | (2006.01) |
| C08L 83/04 | (2006.01) |
| C09D 5/00 | (2006.01) |
| C09D 5/02 | (2006.01) |
| C09D 183/04 | (2006.01) |
| C09J 183/04 | (2006.01) |
| C09J 7/22 | (2018.01) |
| C09J 7/20 | (2018.01) |
| C09J 7/25 | (2018.01) |
| C09J 7/21 | (2018.01) |
| C08G 77/20 | (2006.01) |
| C08G 77/14 | (2006.01) |

(52) U.S. Cl.
CPC ............ *C09J 7/046* (2013.01); *C08K 5/5435* (2013.01); *C08L 83/04* (2013.01); *C08L 83/06* (2013.01); *C09D 5/008* (2013.01); *C09D 5/024* (2013.01); *C09D 183/04* (2013.01); *C09J 7/201* (2018.01); *C09J 7/21* (2018.01); *C09J 7/22* (2018.01); *C09J 7/255* (2018.01); *C09J 183/04* (2013.01); *C08G 77/14* (2013.01); *C08G 77/16* (2013.01); *C08G 77/20* (2013.01); *C08L 2201/52* (2013.01); *C08L 2205/025* (2013.01); *C09J 2483/005* (2013.01)

(58) Field of Classification Search
None
See application file for complete search history.

(56) References Cited

U.S. PATENT DOCUMENTS

| 5,672,428 A | 9/1997 | Muschelweicz et al. |
| 5,683,527 A | 11/1997 | Angell et al. |
| 6,245,852 B1* | 6/2001 | Hasegawa et al. .... C08G 77/06 516/58 |
| 6,410,134 B1 | 6/2002 | Park et al. |
| 2003/0088042 A1* | 5/2003 | Griswold et al. .... C09D 183/04 528/15 |
| 2004/0054070 A1* | 3/2004 | Bouvy et al. ............ C08J 3/215 524/588 |
| 2004/0161618 A1* | 8/2004 | Griswold et al. .......... C08J 3/03 428/447 |

(Continued)

FOREIGN PATENT DOCUMENTS

| CN | 1809619 A | 7/2006 |
| CN | 101517002 A | 8/2009 |

(Continued)

OTHER PUBLICATIONS

Gelest, Reactive Silicones: Forging New Polymer Links, 64 pages, 2004. (Year: 2004).*

(Continued)

*Primary Examiner* — Robert S Loewe
(74) *Attorney, Agent, or Firm* — Warner Norcross & Judd LLP

(57) ABSTRACT

A silicone emulsion comprises: (A) a silicone compound comprising an anchorage additive for enhancing the adhesion to a polymer film substrate; (B) at least one surfactant; and (C) water. The anchorage additive is the reaction product of (A1) a fluid polyorganosiloxane containing at least one alkenyl group and at least one silanol group with (A2) a hydrolysable silane containing at least one epoxide group. A water-based anchorage additive comprises the silicone emulsion. A silicone release coating composition comprises: (X1) the silicone emulsion; and (X2) at least one curable silicone composition, e.g. a water-based silicone release coating composition. The curable silicone release coating composition may be applied to a sheet-form substrate and cured to form a release-coated layer having good release property and improved rub-off resistance on the substrate.

20 Claims, No Drawings

(56) References Cited

U.S. PATENT DOCUMENTS

| | | | |
|---|---|---|---|
| 2004/0254274 A1 | 12/2004 | Griswold | |
| 2006/0128921 A1* | 6/2006 | Cray et al. | C09D 183/04 528/31 |
| 2008/0107815 A1* | 5/2008 | Schneider et al. | C08J 3/03 427/387 |
| 2010/0255205 A1 | 10/2010 | Cray et al. | |
| 2011/0201751 A1* | 8/2011 | Liu et al. | C08G 77/045 524/837 |

FOREIGN PATENT DOCUMENTS

| | | | |
|---|---|---|---|
| CN | 102337031 A | 2/2012 | |
| GB | 1541801 A | 3/1979 | |
| WO | WO2004046267 A2 | 6/2004 | |
| WO | WO2008019953 A1 | 2/2008 | |
| WO | WO-2012031903 A2 * | 3/2012 | A61K 8/062 |

OTHER PUBLICATIONS

PCT/CN2014/092268 International Search Report dated Jan. 28, 2015, 3 pages.

English language abstract and machine translation for CN102337031 (A) extracted from http://worldwide.espacenet.com database on Jun. 3, 2016, 17 pages.

\* cited by examiner

ANCHORAGE ADDITIVE EMULSION FOR SILICONE RELEASE COATING COMPOSITION

CROSS-REFERENCE TO RELATED APPLICATIONS

This application is the National Stage of International Application No. PCT/CN2014/092268 filed on 26 Nov. 2014, which claims priority to and all advantages of International Patent Application No. PCT/CN2013/087825 filed on 26 Nov. 2013, the content of which is hereby incorporated by reference.

TECHNICAL FIELD

The present invention relates to a water-based/waterborn (WB) anchorage additive suitable for silicone release coating compositions to improve adhesion to paper and polymeric substrates. Furthermore, the present invention relates to a method for making a water-based anchorage additive, and a method for treating paper and polymeric substrates by using silicone release coating with the water-based anchorage additive. In particular, this invention relates to a novel silicone emulsion, a water-based anchorage additive comprising said novel silicone emulsion, a silicone release coating composition comprising the novel silicone emulsion, a cured release coating-bearing sheet-form substrate yielded by curing the silicone release coating composition in the form of a thin film on a sheet-form substrate, and a production method of the cured release coating-bearing sheet-form substrate.

Release coating compositions typically comprise (1) a compound (also called SiH silicone) which is a polysiloxane having at least one hydrogen bonded to a Si atom and (2) a compound (also called vinyl silicone) which is a polysiloxane having at least one alkenyl group, for example vinyl group, bonded to a Si atom. Components (1) and (2) react together by hydrosilylation to form a release coating.

A release coating composition can further comprise a "silicone resin" which is a polysiloxane containing T and/or Q units.

BACKGROUND ART

Aqueous (water-based) curable silicone release coating composition is well-known in this field.

For example, WO 2008019953 (Patent Reference 1, incorporated herein for reference) discloses a release coating composition comprising a polyorganosiloxane (A) having alkenyl groups, a crosslinking agent (B) having organohydrogensiloxane groups, a catalyst for the hydrosilylation reaction between (A) and (B), and an anchorage additive for enhancing the adhesion of the composition to a polymer film substrate, characterised in that the anchorage additive is the reaction product of a fluid polyorganosiloxane (C) containing at least one alkenyl group and at least one silanol group with a hydrolysable silane (D) containing at least one epoxide group.

For example, U.S. Pat. No. 5,672,428 (Patent Reference 2, incorporated herein for reference) discloses a silicone release polyester film coated with an aqueous silicone coating composition on one surface. The aqueous silicone release coating composition is made up of an alkylvinylpolysiloxane containing vinyl groups, a tin or platinum catalyst, a glycidoxysilane and an alkylhydrogenpolysiloxane. The glycidoxysilane is said to give excellent rub-off resistance performance.

For example, US 20030088042 (Patent Reference 3, incorporated herein for reference) discloses that release compositions of the invention comprise additives for improved anchorage of release coatings comprising the reaction product of: the reaction product of: 1) $RE_hSi(ORA)_{3-h}$; 2) $Rv1_i Si(ORB)_{3-i}$; 3) a condensation catalyst; and 4) water, wherein RE=epoxide containing radical, Rv1=vinyl terminal olefinic monovalent hydrocarbon radicals, RA=hydrocarbon radicals; RB=hydrocarbon radicals; h=1-3, and i=1-3. The release coating compositions are said to have improved adhesion to paper and polymeric substrates.

For example, US 20040161618 (Patent Reference 4, incorporated herein for reference) discloses an additive for anchorage of release coating comprising $(RaSiO_{(4-1)/2})_n$; n>3, a=1-3, R=an oxirane or epoxide comprising radical with at least one oxirane or epoxide and hydride being present on the molecule; or a carboxylic acid anhydride radical with at least one carboxylic acid anhydride and hydride being present on the molecule. The release coating compositions are said to have improved adhesion to paper and polymeric substrates.

For example, U.S. Pat. No. 6,410,134 (Patent Reference 5, incorporated herein for reference) discloses an aqueous silicone coating composition and polyester release films coated therewith. The aqueous silicone coating composition included an alkylvinylpolysiloxane, an alkylhydrogenpolysiloxane, a platinum complex catalyst and a water-soluble polyester resin is advantageously used for the preparation of a polyester release film having good release property and improved rub-off resistance.

Although water-based curable silicone release coating compositions are useful for low environmental burden and good in human safety without using flammable and harmful organic solvent, the above conventional water-based curable silicone release coating compositions have only insufficient rub-off resistance on the substrate and poor release property.

Because of relatively poor releasing property & rub-off resistance of cured layer, the above conventional water-based curable silicone release coating compositions can be used in limited applications. The above Patent References 1-5 fail don't always meet the desirable requirements on improved releasing property & rub-off resistance of cured layer. Particularly, WO 2008019953 discloses the similar unemulsified anchorage additive, but WO 2008019953 never teaches or suggests emulsifying the anchorage additive into water. Furthermore, it can be desired to emulsify silicone compound of said anchorage additive and other optional silicones (vinylsilicones, Si—H silicones, silicone resins, etc.) with specific nonionic surfactants with water-soluble polyvinylalcohol (PVA) or other co-surfactants. The above Patent References 1-5 are silent to use an emulsion of water-based anchorage additive as a component of a release coating composition. The applicant has surprisingly found that combined with water-based silicone-type anchorage additive, the potential application of water-based curable silicone release coating compositions will be broadened drastically.

Therefore, there still exists a need in the art for obtaining practically useful, safe and environmentally-friendly water-based curable silicone release coating compositions, and the production procedure of a cured release coating-bearing sheet-form substrate, i.e. coated release paper, PET film or other applications and allowing a high versatility of choice of components of the release coating composition.

SUMMARY OF THE INVENTION

The present invention has an object of providing a novel water-based anchorage additive for silicone release coating compositions to improve adhesion to paper and polymeric substrates. Another object of the present invention is to provide a method for making the water-based anchorage additive, and a method for treating paper and polymeric substrates using silicone release coating with the water-based anchorage additive.

This invention discloses the use in silicone release coating applications of certain oil-in-water emulsions containing a surfactant such as, for example, water-soluble PVA and an anchorage additive compound (i.e. an alkoxy containing alkenyl/epoxy functional organopolysiloxane) with or without other ingredients in order to provide good anchorage or adhesion to paper and polymeric substrates.

The release force can be adjusted by changing the level of vinyl silicone or SiH silicone or silicone resin within the composition. A typical surfactant is water-soluble polyvinylalcohol (PVA). The presence of surfactant and siloxane additives with different functional groups plays an important role in providing enhanced anchorage property to organosilicone compounds. In particular, the level of the compound to base silicone release coating would affect the final anchorage performance. Water-soluble PVA is typically used for improving the wetting performance and rub-off resistance performance although other surfactants can be used.

The silicone release coating treated on the polymeric films and paper with the emulsion of the present invention may have enhanced anchorage performance through incorporation of a surfactant water-soluble PVA and an effective amount of the anchorage additive applied to base silicone release coating. The emulsion formulation comprise about 1-60 wt % of the anchorage additive and with or without vinyl silicone or SiH silicone or silicone resin, typically about 10-50 wt % with suitable amount surfactant such as water-soluble PVA. The ratio of the compound to base silicone release coating could be as low as 0.5% by weight of the silicone solids for anchorage enhancement.

Therefore, it is an object of the present invention to provide a process for providing silicone release coating with said water-based anchorage additive on polymeric films and paper, where the coating occurs in-line or off-line, during the manufacturing process for the substrate before it is heat-set.

The new emulsion composition includes typically a surfactant and the anchorage additive. The new emulsion composition can additionally comprise vinyl silicone. The new emulsion composition can additionally comprise SiH silicone but, as anchorage additive and SiH silicone are both reactive, the new emulsion is preferably substantially free of SiH silicone. The new emulsion composition can additionally comprise a silicone resin and co-surfactants. Preferably, the new emulsion is free of vinylsilicone.

The new emulsion of anchorage additive can be mixed with SiH silicone and vinylsilicone in separate emulsions in order to form the release coating composition. This enables to mix easily components of the release coating composition in handy liquid form.

The emulsion droplet is formed by emulsifying all the ingredients and diluted by water at room temperature. The particle size for the droplet is less than 1 um. Small particle size of the emulsion facilitates molecular migration of the composition on the treated substrate. The emulsion ratio to base silicone release coating could be easily adjusted.

It is known to emulsify a silicone release coating composition containing all ingredients needed to obtain a release coating. The new emulsion does not comprise all ingredients. The new emulsion containing anchorage additive (AA) allows for broader versatility and freedom as the level of anchorage additive and its composition can be adapted to the requirements with or without adapting the nature and level of the other ingredients namely SiH silicone and vinylsilicone. Furthermore, a new emulsion containing anchorage additive without SiH silicone and/or without vinyl silicone may have a better storage stability along time.

The different functional groups of silicone compound (comprising component (A) and other silicones) play an important role in providing enhanced anchorage property to organosilicone compounds. The improvement to such product by the presence of alkoxy, epoxy and alkenyl groups on the silicone structure is to improve the reaction of alkoxy and epoxy groups with the hydroxyl groups on the substrates and the reaction of alkenyl groups with SiH groups in base silicone release coating. This emulsion can give better anchorage performance.

DISCLOSURE OF THE INVENTION

The objects cited above can be achieved by the following:
{1} A silicone emulsion comprising:
   A. 0.1 to less than 80.0 parts by weight of silicone compound comprising an anchorage additive for enhancing the adhesion to a polymer film substrate, wherein the anchorage additive is the reaction product of a fluid polyorganosiloxane (A1) containing at least one alkenyl group and at least one silanol group with a hydrolysable silane (A2) containing at least one epoxide group;
   B. 0.1 to less than 20.0 parts by weight of at least one surfactant; and
   C. 5.0 to 99.8 parts by weight of water.
{2} The silicone emulsion according to {1}, characterized in that a fluid polyorganosiloxane (A1) is a copolymer of methylvinylsiloxane units and dimethylsiloxane units, and having a degree of polymerisation of at 4 to 50 siloxane units with terminal silanol groups.
{3} The silicone emulsion according to {1}, characterized in that a hydrolysable silane (A2) is an (epoxy-substituted alkyl) di- or trialkoxy silane.
{4} The silicone emulsion according to any of {1} to {3}, characterized in that the silicone compound is a mixture of said anchorage additive for enhancing the adhesion to a polymer film substrate and at least one silicone (A3) selected from the group consisting of polyorganosiloxane having at least one alkenyl group, polyorganosiloxane having at least one alkoxy group, polyorganosiloxane having at least one epoxy group, polyorganosiloxane having at least one Si-bonded hydrogen atom, and silicone resins in the ratio of 100:0 to 20:80 by weight.
{5} The silicone emulsion according to any of {1} to {4}, characterized in that the component (B) comprises at least one nonionic surfactant selected from the group consisting of polyether compounds, polyether-modified silicones, water-soluble polyester compounds, water-soluble polyvinyl alcohols and water-soluble polyvinylacetates.
{6} The silicone emulsion according to any of {1} to {5}, characterized in that the droplet of the silicone emulsion have an average particle size of less than 1 um, measured by the laser diffraction/dispersion method for emulsion particles.
{7} A water-based anchorage additive comprising said silicone emulsion according to any of {1} to {6}.

{8} A silicone release coating composition comprising:
  (X1) the silicone emulsion according to any of {1} to {6}, and
  (X2) at least one curable silicone composition.
{9} The silicone release coating composition according to {8}, characterized in that the component (X2) is a water-based hydrosilylation reaction curable silicone composition.
{10} A cured release coating-bearing sheet-form substrate yielded by curing the silicone release coating composition according to {8} or {9} in the form of a thin film on a sheet-form substrate.
{11} The cured release coating-bearing sheet-form substrate according to {10}, characterized in that the sheet-form substrate is glassine paper, clay-coated paper, polyolefin-laminated paper, thermoplastic resin film, or metal foil.
{12} A production method of a cured release coating-bearing sheet-form substrate by applying the silicone release coating composition according to {8} or {9} on at least one side of sheet-form substrate and cured at a temperature of at least 100° C.

Advantageous Effect

The present invention can produce the following technical effects:

The anchorage additive and other optional silicones can be stably emulsified into water preferably with average particle size of less than 1 um.

The silicone emulsion can be used as WB anchorage additive to curable compositions to improve the rub-off resistance of cured layer to the substrate.

The WB anchorage additive is easily and preferably combined with WB curable silicone release coating composition by a desirable fraction.

The WB anchorage additive does not impair the heat curing property or film formation of WB curable silicone release coating composition on the substrate. By using the WB anchorage additive, the obtained cured release coating layer can perform good anchorage to the substrate even under severe storage condition, and also have a good applicability to plastic film-form substrate such as PET films.
This results in the application use of:
i) Broadening potential application of water-based curable silicone release coating compositions, to even where conventional WB curable composition cannot be applied for its poor rub-off resistance.
ii) Environmentally-friendly and harmless water-based curable silicone release coating compositions and coating procedure thereof without using organic solvent.
iii) The cured release coating-bearing sheet-form substrate (ex. release liner).

BEST MODE FOR CARRYING OUT THE INVENTION

The novel silicone emulsion composition of the present invention comprises (A) silicone compound comprising anchorage additive and other optional silicones, (B) surfactant and (C) water. In this invention, the component (A) is an anchorage additive for enhancing the adhesion of the composition to a polymer film substrate and a reaction product of a fluid polyorganosiloxane (A1) containing at least one alkenyl group and at least one silanol group with a hydrolysable silane (A2) containing at least one epoxide group, or a mixture of said anchorage additive and other optional silicones.

Component (A) is silicone compound comprising an anchorage additive for enhancing the adhesion of the composition to a polymer film substrate, wherein the anchorage additive is the reaction product of a fluid polyorganosiloxane (A1) containing at least one alkenyl group and at least one silanol group with a hydrolysable silane (A2) containing at least one epoxide group.

The silicone compound may be said anchorage additive or a mixture of said anchorage additive and other optional silicones (ex. vinyl silicone, organohydrogen(Si—H) silicone or silicone resin). Said novel silicone emulsion can be used as water-based anchorage additive.

The improvement to such product by the presence of alkoxy, epoxy and alkenyl groups on the silicone structure is to improve the reaction of alkoxy and epoxy groups with the hydroxyl groups on the substrates and the reaction of alkenyl groups with SiH groups in base silicone release coating. The new emulsion can give better anchorage performance.

The fluid polyorganosiloxane (A1) used in the preparation of the anchorage additive generally contains at least one alkenyl group and at least one silanol group. The polyorganosiloxane (A1) generally contains a chain of at least 3 siloxane units and is preferably a substantially linear polydiorganosiloxane. The polyorganosiloxane (A1) preferably has a degree of polymerisation of at least 4 and preferably at least 6 siloxane units. The polyorganosiloxane (A1) typically has a degree of polymerisation up to 30, 50 or 200 siloxane units. The polyorganosiloxane (A1) can for example have a viscosity in the range 2 to 200 mm$^2$/s at 25° C. The alkenyl group can for example have from 2 to 6 carbon atoms, for example a vinyl or 5-hexenyl group. The polyorganosiloxane (A1) usually also contains alkyl groups, particularly alkyl groups having 1 to 4 carbon atoms such as methyl or ethyl groups and may contain aryl groups such as phenyl. The alkenyl groups can be present as pendant groups, for example the copolymer (A1) can be a polymethylvinylsiloxane, or a copolymer of methylvinylsiloxane units and dimethylsiloxane units, or a copolymer of divinylsiloxane units and dimethylsiloxane units. Alternatively or additionally the alkenyl groups can be present as terminal groups, for example in methylvinylsilanol terminal units. The silanol groups are preferably present in terminal units such as dimethylsilanol or methylvinylsilanol terminal units. Most preferably the polyorganosiloxane (A1) is a polydiorganosiloxane having terminal silanol groups at both ends of the siloxane chain, although part or all of the polyorganosiloxane (A1) may have one silanol end group and one Si-alkoxy end group, for example a dimethylmethoxysilyl end unit. The polyorganosiloxane (A1) can for example be formed by the reaction of methylvinyldimethoxysilane and dimethyldimethoxysilane in the presence of a silane hydrolysis catalyst such as a base or an acid.

The hydrolysable silane (A2) which is reacted with the polyorganosiloxane (A1) to form the anchorage additive generally contains at least one epoxide group per molecule. The epoxide group can for example be present as a glycidyl group or a 3,4-epoxycyclohexyl group. The silane (A2) can for example be of the formula $(R^*)_e(R'')_f Si(OA)_{(4-e-f)}$, where R* represents a substituted alkyl group containing an epoxide group, R" represents an alkyl group preferably having 1 to 6 carbon atoms such as a methyl or ethyl group, A represents an alkyl group having 1 to 4 carbon atoms such as a methyl or ethyl group, e is 1, 2 or 3, most preferably 1, and f is 0, 1 or 2, most preferably 0 or 1. The group R* can for example be a 3-glycidoxypropyl, glycidyl, 5,6-epoxyhexyl, 3,4-epoxycyclohexyl, 2-(3,4-epoxycyclohexyl)ethyl, 3-(3,4-epoxycyclohexyl)propyl or 3,4-epoxycyclohexylmethyl group. Examples of suitable hydrolysable silanes (A2) include 3-glycidoxypropyltrimethoxysilane, 3-glycidoxypropyltriethoxysilane, methyl(3-glycidoxypropyl)dimethoxysilane, methyl(3-glycidoxypropyl)diethoxysilane, 2-(3,4-epoxycyclohexyl)ethyltrimethoxysilane and 3-(3,4-epoxycyclohexyl)propyltrimethoxysilane.

The fluid polyorganosiloxane (A1) and the hydrolysable silane (A2) can be reacted at elevated temperature and/or in the presence of a silanol condensation catalyst. The catalyst can for example be a base such as potassium hydroxide, sodium hydroxide, potassium silanolate or a phosphazene base, or can be an acid such as HCl, or can be a titanate ester or an organic compound of tin. The temperature of reaction is preferably in the range 50 to 150° C. The novel anchorage additive thus prepared generally contains at least one epoxy group, at least one alkenyl group and at least one alkoxy group in its molecule.

The fluid polyorganosiloxane (A1) and the hydrolysable silane (A2) are preferably reacted at 0.5 to 1.5 moles silane (A2) per silanol group of fluid polyorganosiloxane (A1). The weight ratio of fluid polyorganosiloxane (A1) to hydrolysable silane (A2) will vary according to the chain length of fluid polyorganosiloxane (A1), but is usually in the range 25:75 to 95:5, particularly 40:60 to 90:10.

The fluid polyorganosiloxane (A1) and the hydrolysable silane (A2) can if desired be co-reacted with a dialkyl-dialkoxysilane such as for example dimethyldimethoxysilane and/or with an alkenyl dialkoxysilane such as for example methylvinyldimethoxysilane. Such a diorganodialkoxysilane reacts as a chain extender for the siloxane chains of the fluid polyorganosiloxane (A1) while still allowing reaction with the epoxide functional hydrolysable silane (A2).

The extent of reaction between the fluid polyorganosiloxane (A1) and the hydrolysable silane (A2) is preferably sufficient that at least 50%, and preferably at least 80%, of the hydrolysable epoxy-functional silane (A2) is present in the anchorage additive as reaction product rather than as unreacted silane. We have found that the reaction product when used as anchorage additive has better compatibility with the other components of the silicone release coating than the hydrolysable epoxy-functional silane (A2) and (whether or not (A2) is used with additional hydrolysable vinyl silane or siloxane) leads to more consistent anchorage to polymer film substrates. The hydrolysable epoxy-functional silane (A2) has some tendency to self-condense when the silicone release coating composition is cured, forming siloxane resin of reduced compatibility with the cure product of the silicone emulsion.

We believe that the presence in the reaction product of siloxane chains derived from the fluid polyorganosiloxane (A1) leads to better compatibility with the other components of the silicone release coating and may give more consistent anchorage to polymer film substrates than a reaction product of the hydrolysable epoxy-functional silane (A2) with a vinyltrialkoxysilane.

Silicone compound (A) may be only a reaction product between (A1) and (A2), i.e. 100% of said reaction product, or a mixture of said reaction product and unreacted silicone (A3) in a ratio of 100:0 to 20:80 by weight. The optional silicone (A3) is not a said reaction product between (A1) and (A2) components, but an independent reactive silicone. When the silicone compound (A) comprises both said reaction product and the optional silicone (A3), the anchorage is further improved in the obtained emulsion. Preferably, a mixture of said reaction product and vinylsiloxane, especially, polydimethylsiloxane having alkenyl groups at both terminals, in a ratio of 50:50 by weight was used as silicone compound emulsified in the water.

Other optional silicones are preferred to be at least one silicone (A3) selected from the group consisting of polyorganosiloxane having at least one alkenyl group, polyorganosiloxane having at least one alkoxy group, polyorganosiloxane having at least one epoxy group, polyorganosiloxane having at least one Si-bonded hydrogen atom, and silicone resins. Most preferably, optional silicone (A3) is a vinyldimethylsiloxy-terminated polydimethylsiloxane.

The mixing ratio of said anchorage additive and other optional silicones is not limited in the component (A), but preferably in the ratio of 100:0 to 20:80 by weight. More preferably, the mixing ratio ranges 100:0 to 30:70. Especially, the ratio of 100:0 and 50:50 is most preferred.

Component (B), a surfactant, is an ingredient of emulsifying said component (A) into water (C), which is not particularly limited, as long as it can emulsify said component (A) into water (C), preferably comprising at least one nonionic surfactant selected from the group consisting of polyether compounds, polyether-modified silicones, water-soluble polyester compounds, water-soluble polyvinyl alcohols and water-soluble polyvinylacetates.

Preferred examples of surfactants include the following:
PVA: polyvinyl alcohol;
Nonionic surfactant 1: iso-C13 oxo alcohol ethoxylates EO(12) [Lutensol TO 12];
Nonionic surfactant 2: Polyoxyethylene(23) Lauryl Ether [Brij35];
Nonionic surfactant 3: Polyoxyethylene(4) Lauryl Ether [Brij30].

In the nonionic surfactant of the present invention, which is used as ingredient, HLB should be typically 10-15, the pH should be typically 6.5 or less, and the ionic conductance should be 30 μS/cm or less. This ingredient is used to emulsify a mixture consisting of the silicone compound.

Examples of a nonionic surfactant used by the present invention are an alkyl ether, such as polyoxyethylene lauryl ether and polyoxyethylene tridecyl ether; an alkyl ester, such as polyoxyethylene oleate and polyoxyethylene laurate; and an alkyl aryl ether, such as polyoxyethylene nonylphenyl ether and polyoxyethylene octylphenyl ether, but from the viewpoint of emulsification and safety, a polyoxyethylene alkyl ether is preferred.

In the present invention, if a surfactant other than one for which the HLB is 10-15, the pH is 6.5 or less, and the ionic conductance is 30 μS/cm or less is used, the prepared emulsion composition may deteriorate with time. A cationic and an anionic surfactant can also be used together in amounts which do not impair the effect of the emulsion composition of the present invention. By suitably using a cationic and an anionic surfactant, it is possible to obtain an improvement in the wetability or levelling properties of the emulsion.

The polyvinyl alcohol (hereafter, PVA) in the present invention is preferred to have a saponification degree of 86-98 mol %, and the viscosity of a 4% aqueous solution at 20° C. should be preferably 4-100 mPa·s. This PVA is a preferred ingredient as an assistant co-surfactant to promote emulsification with the surfactant, and stabilizes the formed emulsion. That is to say, the combination of PVA with other surfactants further improves the temporal stability of the obtained emulsion-type anchorage additive. If the saponification degree is less than 85 mol % or more than 99 mol %, the emulsion stabilizing effect is inadequate. Also, if the viscosity of a 4% aqueous solution at 20° C. is less than 3 mPa·s, the emulsion stabilizing effect is poor, while if it exceeds 100 mPa·s, the coating properties of the emulsion deteriorate. The polymerization degree of PVA whereof the viscosity of a 4% aqueous solution at 20° C. is 4-100 mPa·s, is equivalent to about 500 to 4,000. Preferably, the surfactant is a water-soluble polyvinylalcohol (PVA) for improving the wetting performance and rub-off resistance performance on the cured release coating.

Component (C), water, is main component of aqueous phase of our inventive emulsion, and exemplified as tap water, purified water, mineral water and the like. In addition, in the aqueous emulsion of the present invention, optional components which are water-soluble or water-dispersible may be previously blended in the water phase unless such component impairs the effect of this invention.

Emulsion Preparation:

The inventive emulsion can be prepared by emulsifying said component (A) including optional silicones with surfactants and/or co-surfactants into water. Preferably, adding water and emulsification process is stepwise manner including multiple emulsification and dispersion procedure. Most preferred emulsification process includes:
(1) Blending said anchorage additive with other optional siloxane if necessary;
(2) Adding surfactants and water into the kettle, mixing until to the blend surfactants system to be thick phase;
(3) Dropping in half of the above silicone blend with suitable shear speed; and adding a little water in case of phase inversion;
(4) Repeating step (3) with ¼ of silicone blend and then adding water; repeating step (3) again until all silicone blend was added;
(5) Adding dilute water step by step until the target silicone content was reached; and measuring the particle size.

An emulsifying device is preferably used in order to bring about uniform emulsion particles (droplets) in the water. This emulsifying device can be exemplified by homomixers, paddle mixers, Henschel mixers, homodispersers, colloid mills, propeller stirrers, homogenizers, continuous inline emulsifying devices, ultrasonic emulsifying devices, and vacuum kneaders.

The particle size for the droplet is not limited, but preferably, the particle size for the droplet is less than 1 um. Small particle size of the emulsion facilitates molecular migration of the composition on the treated substrate. The emulsion ratio to base silicone release coating could be easily adjusted.

Curable Release Coating Composition:

The curable release coating composition comprises at least one curable silicone composition and said novel silicone emulsion composition. Preferably, the curable release coating composition is a water-based silicone release coating composition obtained by mixing said novel silicone emulsion composition (i.e. water-based anchorage additive) with another emulsion containing hydrosilylation reaction curable silicone release coating composition. The silicone release coating composition is advantageously used for the preparation of a polymer/paper release film having good release property and improved rub-off resistance. The most preferable aqueous (WB) curable silicone composition is a water-based hydrosilylation reaction curable silicone composition.

Combination of WB Release Coating Composition with Said WB Anchorage Additive:

The WB release coating composition can be obtained by mixing said aqueous emulsion (i.e. WB anchorage additive of this invention) and other curable composition, preferably WB release composition by known mechanical-mixing device. This mixing device can be exemplified by any mechanical mixers; homomixers, paddle mixers, Henschel mixers, homodispersers, colloid mills, propeller stirrers, homogenizers, continuous inline emulsifying devices, ultrasonic emulsifying devices, and vacuum kneaders.

Film-Form Substrates:

The release coating composition of the invention can be applied to any substrate but is particularly effective on substrates where anchorage is a problem, such as polymer film substrates, for example polyester, particularly polyethylene terephthalate (PET), polyethylene, polypropylene, or polystyrene films, including oriented and biaxially oriented films, for example biaxially oriented polypropylene. The release coating composition can alternatively be applied to a paper substrate, including plastic coated paper, for example paper coated with polyethylene, where anchorage may be a problem.

The silicone release coating composition can be applied to a sheet-form substrate (known as a 'liner' retaining a label, which liner can for example be paper or a polymer film like PET) and cured. Paper, PET-film and other sheet-form substrates are preferred.

Pre-treatment of the film with primer or corona treatment is very common to improve anchorage. The use of the anchorage additive of this invention permits to avoid the need to treat a polyester film surface with primers before applying the release coating. It may be preferred to expose a polymer film substrate to a corona discharge before the release coating is applied. Although the silicone release coating of the invention has improved anchorage even without corona discharge treatment, in certain instances the anchorage may be further improved if the film is corona treated before coating. Optional corona treatment in some cases will further improve the anchorage of the silicone coating to the substrate. But the corona effect is decayed with time when it is exposed to air. Such corona treatment can for example be carried out just before coating the film which is called in-line corona treatment. The corona discharge station can be incorporated as a pre-treatment in the film coating apparatus.

The release coating can for example be applied to the polymer substrate by Mayer bar, spraying, doctor blade, dipping, screen printing or by a roll coater, e.g. an offset web coater, kiss coater or etched cylinder coater.

After application, the release coating is cured on the polymer film at a temperature of 70-190° C., preferably 100-180° C. for example by a laboratory air circulation oven. The new anchorage additive does not affect the cure speed of the emulsion coating. Under lab conditions to get a good silicone cured film, cure speed can be adjusted in a residence time of 1 second to 180 seconds, preferably from 30 seconds to 120 seconds, at an air temperature of 120-180° C. Heating can be carried out much faster by industry process, e.g. an air floating oven or tunnel furnace or by passing the coated film around heated cylinders.

EXAMPLES

Examples and comparative examples are given below in order to specifically describe the present invention; however, the present invention is not limited to the examples that follow. In the examples and comparative examples that follow, parts and percentages are weight parts or weight percentages.

In the present description, percentages are typically weight percentages unless otherwise defined. The proportion of a component when expressed in % means the other component(s) is/are present in percentages such that total is 100.

The average particle size of emulsion particles of examples 1 to 4 was measured by means of a submicron-particle analyzer (the product of Malvern Instruments Co. Ltd.; Mastersizer 2000) for measuring submicron-size particles by a laser diffraction method.

Example 1

In the formulation shown in below Table 1, the emulsion of EXAMPLE 1 was prepared by below procedure.
Emulsification Process:
(i) Si-type Anchorage Additive (AA-1, a siloxane chain rearrangement reaction product of Dimethyl, Methylvinyl Siloxane, Hydroxy-terminated and beta(3,4-epoxycyclohexyl)ethyltrimethoxysilane at the weight ratio of 30:40 with phosphonic acid catalyst) and other optional siloxane (OS-1, vinyldimethylsiloxy terminated polydimethylsiloxane having a viscosity of 2000 mPa·s) was mixed by a weight ratio of 1:1 as "silicone" compound (45 parts);
(ii) Adding surfactants (2.5 parts of PVA, and 0.17 parts of Nonionic surfactant 1 (iso-C13 oxo alcohol ethoxylates EO(12) [Lutensol TO 12]) and 10 parts of water into the kettle, and mixing until to the blend surfactant system to be thick phase;
(iii) Dropping in half of the above silicone blend (20 parts) with suitable shear speed; and adding a little water (2 parts) in case of phase inversion;
(iv) Repeating the above step (iii) with ¼ of silicone blend (10 parts) and then adding water (3 parts); and repeating the above step (iii) again until all silicone blend was added;
(v) Adding dilute water (31 parts) step by step until the target silicone content was reached; and measuring the particle size (PS).

Example 2

In the formulation shown in below Table 1, the emulsion of EXAMPLE 2 was prepared by below procedure.
Emulsification Process:
(i) Si-type Anchorage Additive (AA-1, a siloxane chain rearrangement reaction product of Dimethyl, Methylvinyl Siloxane, Hydroxy-terminated and beta(3,4-epoxycyclohexyl)ethyltrimethoxysilane at the weight ratio of 30:40 with phosphonic acid catalyst) and other optional siloxane (OS-1, vinyldimethylsiloxy terminated polydimethylsiloxane having a viscosity of 2000 mPa·s) was mixed by a weight ratio of 1:1 as "silicone" compound (45 parts);
(ii) Adding surfactants (4.2 parts of Nonionic surfactant 2: Polyoxyethylene(23) Lauryl Ether [product name: Brij35, and 2.1 parts of Nonionic surfactant 3: Polyoxyethylene (4) Lauryl Ether [product name: Brij30] and 4 parts of water into the kettle, and mixing until to the blend surfactant system to be thick phase;
(iii) Dropping in half of the above silicone blend (20 parts) with suitable shear speed; and adding a little water (2 parts) in case of phase inversion;
(iv) Repeating the above step (iii) with ¼ of silicone blend (10 parts) and then adding water (3 parts); and repeating the above step (iii) again until all silicone blend was added;
(v) Adding dilution water (33.6 parts) step by step until the target silicone content was reached; and measuring the particle size (PS).

Example 3

In the formulation shown in below Table 1, the emulsion of EXAMPLE 3 was prepared by below procedure.
Emulsification Process:
(i) Si-type Anchorage Additive (AA-1, a siloxane chain rearrangement reaction product of Dimethyl, Methylvinyl Siloxane, Hydroxy-terminated and beta(3,4-epoxycyclohexyl)ethyltrimethoxysilane at the weight ratio of 30:40 with phosphonic acid catalyst) was used as "silicone" compound (45 parts);
(ii) Adding surfactants (2.5 parts of PVA, and 0.17 parts of Nonionic surfactant 1 (iso-C13 oxo alcohol ethoxylates EO(12) [Lutensol TO 12]) and 10 parts of water into the kettle, and mixing until to the blend surfactant system to be thick phase;
(iii) Dropping in half of the above silicone blend (20 parts) with suitable shear speed; and adding a little water (2 parts) in case of phase inversion;
(iv) Repeating the above step (iii) with ¼ of silicone blend (10 parts) and then adding water (3 parts); and repeating the above step (iii) again until all silicone blend was added;
(v) Adding dilution water (31 parts) step by step until the target silicone content was reached; and, measuring the particle size (PS).

Example 4

In the formulation shown in below Table 1, the emulsion of EXAMPLE 4 was prepared by below procedure.
Emulsification Process:
(i) Si-type Anchorage Additive (AA-1, a siloxane chain rearrangement reaction product of Dimethyl, Methylvinyl Siloxane, Hydroxy-terminated and beta(3,4-epoxycyclohexyl)ethyltrimethoxysilane at the weight ratio of 30:40 with phosphonic acid catalyst) was used as "silicone" compound (45 parts);
(ii) Adding surfactants (4.2 parts of Nonionic surfactant 2: Polyoxyethylene(23) Lauryl Ether [product name: Brij35], and 2.1 parts of Nonionic surfactant 3: Polyoxyethylene(4) Lauryl Ether [product name: Brij30] and 4 parts of water into the kettle, and mixing until to the blend surfactant system to be thick phase;
(iii) Dropping in half of the above silicone blend (20 parts) with suitable shear speed; and adding a little water (2 parts) in case of phase inversion;
(iv) Repeating the above step (iii) with ¼ of silicone blend (10 parts) and then adding water (3 parts); and repeating the above step (iii) again until all silicone blend was added;
(v) Adding dilution water (33.6 parts) step by step until the target silicone content was reached; and measuring the particle size (PS).

TABLE 1

| Example 1 (Anchorage Additive emulsion No. 1) | Example 2 (Anchorage Additive emulsion No. 2) | Example 3 (Anchorage Additive emulsion No. 3) | Example 4 (Anchorage Additive emulsion No. 4) |
|---|---|---|---|
| Silicone: AA-1 + OS-1 (1:1 mixture) | Silicone: AA-1 + OS-1 (1:1 mixture) | Silicone: AA-1 | Silicone: AA-1 |
| Silicone Content = 45% | Silicone Content = 45% | Silicone Content = 45% | Silicone Content = 45% |
| PVA 2.5 | Nonionic surfactant 2 4.2 | PVA 2.5 | Nonionic surfactant 2 4.2 |
| Nonionic surfactant 1 0.17 | Nonionic surfactant 3 2.1 | Nonionic surfactant 1 0.17 | Nonionic surfactant 3 2.1 |
| H2O 10 | H2O 4 | H2O 10 | H2O 4 |
| Silicone 20 | Silicone 20 | Silicone 20 | Silicone 20 |
| H2O 2 | H2O 2 | H2O 2 | H2O 2 |
| Silicone 10 | Silicone 10 | Silicone 10 | Silicone 10 |
| H2O 3 | H2O 3 | H2O 3 | H2O 3 |
| Silicone 10 | Silicone 10 | Silicone 10 | Silicone 10 |
| H2O 31 | H2O 33.6 | H2O 31 | H2O 33.6 |
| Particle size 0.21 um | Particle size 0.15 um | Particle size 0.26 um | Particle size 0.12 um |

*Preservative can be added for commercialization
*2: "AA-1" is a reaction product of Dimethyl, Methylvinyl Siloxane, Hydroxy-terminated and beta(3,4-epoxycyclohexyl)ethyltrimethoxysilane
*3: "OS-1" is vinyldimethylsiloxy terminated polydimethylsiloxane having a viscosity of 2000 mPa·s

Example 5

Preparation and Evaluation of WB Silicone Release Coating Composition

In the formulation shown in below Table 2, the WB silicone release coating composition of Example 5 was prepared by below procedure:

(i) Adding 80 g water to 18 g of Hydrosilylation curable silicone base composition (coating base polymer, 38.00 parts of vinyl functional polydimethyl siloxane which include Q ($SiO_{4/2}$) in siloxane chain, the structure of polymer is represented by average formula of siloxane units; $(M^{Vi})_4 D_n Q$ (In the formula, "$M^{Vi}$" designates vinyldimethylsiloxy unit ($ViMe_2SiO_{1/2}$), "D" designates dimethylsiloxy unit ($Me_2SiO_{2/2}$) and Q designates $SiO_{4/2}$ units binding other four different siloxy units. "n" is a number that provide the viscosity of 130 mPas of the Q-branched polymer) and 2.20 parts of Dimethyl, Methylhydrogen Siloxane, Trimethylsiloxy-terminated) in a beaker;

(ii) Adding 0.8 g of the anchorage additive (AA) emulsion obtained in EXAMPLE 1 (Anchorage Additive emulsion No. 1) and gentle mixing;

(iii) Adding 2 g Vinylsiloxane+Catalyst (Vi+catalyst emulsion, a reactive emulsion composition comprising 58.00 parts of Water, 39 parts of Dimethyl Siloxane, Dimethylvinylsiloxy-terminated, 1.30 parts of Vinyl Alcohol Polymer with Vinyl Acetate, 0.53 parts of Tetramethyldivinyldisiloxane Complexes (Platinum) catalyst) to the dilution water; and mixing again.

Evaluation Conditions:
(i) Substrate: 50 um corona pre-treated PET film;
(ii) Mayer Bar: #6 or #3 (using standardized Coating Bar);
(iii) Silicone coated film cure at oven setting at 160° C./60 sec or 170° C./60 sec.

Evaluation of Rub-Off Resistance (RO (%)) of Cured Layer to the Substrate:
(i) Each of two samples, Coat weight (C/W) were tested by XRF (Coat weight (C/W): Use Lab-X3500 instrument to detect the coat weight of silicone. Use uncoated PET as blank. Refer to FINAT Test Method No. 7 (FINAT Technical Handbook 7th edition, 2005)) (XRF: Lab-X3500 X-ray Fluorescence Spectrometer (XRF) manufactured by Oxford Instruments PLC, Oxon, United Kingdom);
(ii) Coat weight (C/W RO) after rub off (15 cycles, 900 g weight, 30 cycles/min by Elcometer 1720 Abrasion Tester) was tested by XRF;
(iii) RO (%)=average (C/W RO)/(C/W)*100
(i) In similar manner, RO (%) was measured by the samples at initial, after 10 days at Room Temperature (RT), and after 7 days at 70° C. under 90% of humidity.
The results were shown in the following Table 3.

Example 6

Preparation and Evaluation of WB Silicone Release Coating Composition

In the formulation shown in below Table 2, the WB silicone release coating composition of Example 6 was prepared by below procedure:

(i) Adding 80 g water to 18 g of Hydrosilylation curable silicone base composition (coating base polymer 38.00 parts of vinyl functional polydimethyl siloxane which include Q ($SiO_{4/2}$) in siloxane chain, the structure of polymer is represented by average formula of siloxane units; $(M^{Vi})_4 D_n Q$ (In the formula, "$M^{Vi}$" designates vinyldimethylsiloxy unit ($ViMe_2SiO_{1/2}$), "D" designates dimethylsiloxy unit ($Me_2SiO_{2/2}$) and Q designates $SiO_{4/2}$ units binding other four different siloxy units. "n" is a number that provide the viscosity of 130 mPas of the Q-branched polymer) and 2.20 parts of Dimethyl, Methylhydrogen Siloxane, Trimethylsiloxy-terminated) in a beaker;
(ii) Adding 0.8 g of the anchorage additive (AA) emulsion obtained in EXAMPLE 2 (Anchorage Additive emulsion No. 2) and gentle mixing;
(iii) Adding 2 g Vinylsiloxane+Catalyst (Vi+catalyst emulsion, an reactive emulsion composition comprising 58.00 parts of Water, 39 parts of Dimethyl Siloxane, Dimethylvinylsiloxy-terminated, 1.30 parts of Vinyl Alcohol Polymer with Vinyl Acetate, 0.53 parts of Tetramethyldivinyldisiloxane Complexes (Platinum) catalyst) to the diluted by water; and mixing it again.

Evaluation Conditions:
(i) Substrate: 50 um corona pre-treated PET film;
(ii) Mayer Bar: #6 or #3 (using standardized Coating Bar);
(iii) Silicone coated film cure at oven setting at 160° C./60 sec or 170° C./60 sec.

Evaluation of Rub-Off Resistance of Cured Layer to the Substrate:
(i) Each of two samples, Coat weight (C/W) were tested by XRF (Coat weight (C/W): Use Lab-X3500 instrument to detect the coat weight of silicone. Use uncoated PET as blank. Refer to FINAT Test Method No. 7 (FINAT Technical Handbook 7th edition, 2005)) (XRF: Lab-X3500 X-ray Fluorescence Spectrometer (XRF) manufactured by Oxford Instruments PLC, Oxon, United Kingdom);
(ii) Coat weight (C/W RO) after rub off (15 cycles, 900 g weight, 30 cycles/min by Elcometer 1720 Abrasion Tester) was tested by XRF;
(iii) RO (%)=average (C/W RO)/(C/W)*100
(i) In similar manner, RO (%) was measured by the samples at initial, after 10 days at Room Temperature (RT), and after 7 days at 70° C. under 90% of humidity.

The results were shown in the following Table 3.

Example 7

Preparation and Evaluation of WB Silicone Release Coating Composition

In the formulation shown in below Table 4, the WB silicone release coating composition of Example 7 was prepared by below procedure:
(i) Adding 80 g water to 18 g of Hydrosilylation curable silicone base composition (coating base polymer, 38.00 parts of vinyl functional polydimethyl siloxane which include Q ($SiO_{4/2}$) in siloxane chain, the structure of polymer is represented by average formula of siloxane units; $(M^{Vi})_4D_nQ$ (In the formula, "$M^{Vi}$" designates vinyldimethylsiloxy unit ($ViMe_2SiO_{1/2}$), "D" designates dimethylsiloxy unit ($Me_2SiO_{2/2}$) and Q designates $SiO_{4/2}$ units binding other four different siloxy units. "n" is a number that provide the viscosity of 130 mPas of the Q-branched polymer) and 2.20 parts of Dimethyl, Methylhydrogen Siloxane, Trimethylsiloxy-terminated) in a beaker;
(ii) Adding 0.4 g of the anchorage additive (AA) emulsion obtained in EXAMPLE 3 (Anchorage Additive emulsion No. 3) and gentle mixing;
(iii) Adding 2 g Vinylsiloxane+Catalyst (Vi+catalyst emulsion, an reactive emulsion composition comprising 58.00 parts of Water, 39 parts of Dimethyl Siloxane, Dimethylvinylsiloxy-terminated, 1.30 parts of Vinyl Alcohol Polymer with Vinyl Acetate, 0.53 parts of Tetramethyldivinyldisiloxane Complexes (Platinum) catalyst) to the diluted by water; and mixing it again.

Evaluation Conditions:
(i) Substrate: 50 um corona pre-treated PET film;
(ii) Mayer Bar: #6 or #3 (using standardized Coating Bar);
(iii) Silicone coated film cure at oven setting at 160° C./60 sec or 170° C./60 sec. Evaluation of rub-off resistance of cured layer to the substrate:
(i) Each of two samples, Coat weight (C/W) were tested by XRF (Coat weight (C/W): Use Lab-X3500 instrument to detect the coat weight of silicone. Use uncoated PET as blank. Refer to FINAT Test Method No. 7 (FINAT Technical Handbook 7th edition, 2005)) (XRF: Lab-X3500 X-ray Fluorescence Spectrometer (XRF) manufactured by Oxford Instruments PLC, Oxon, United Kingdom);
(ii) Coat weight (C/W RO) after rub off (15 cycles, 900 g weight, 30 cycles/min by Elcometer 1720 Abrasion Tester) was tested by XRF;
(iii) RO (%)=average (C/W RO)/(C/W)*100
(i) In similar manner, RO (%) was measured by the samples at initial, after 10 days at Room Temperature (RT), and after 7 days at 70° C. under 90% of humidity.

The results were shown in the following Table 5.

Example 8

Preparation and Evaluation of WB Silicone Release Coating Composition

In the formulation shown in below Table 4, the WB silicone release coating composition of Example 8 was prepared by below procedure:
(i) Adding 80 g water to 18 g of Hydrosilylation curable silicone base composition (coating base polymer, 38.00 parts of vinyl functional polydimethyl siloxane which include Q ($SiO_{4/2}$) in siloxane chain, the structure of is represented by average formula of siloxane units; $(M^{Vi})_4D_nQ$ (In the formula, "$M^{Vi}$" designates vinyldimethylsiloxy unit ($ViMe_2SiO_{1/2}$), "D" designates dimethylsiloxy unit ($Me_2SiO_{2/2}$) and Q designates $SiO_{4/2}$ units binding other four different siloxy units. "n" is a number that provide the viscosity of 130 mPas of the Q-branched polymer) and 2.20 parts of Dimethyl, Methylhydrogen Siloxane, Trimethylsiloxy-terminated) in a beaker;
(ii) Adding 0.4 g of the anchorage additive (AA) emulsion obtained in EXAMPLE 4 (Anchorage Additive emulsion No. 4) and gentle mixing;
(iii) Adding 2 g Vinylsiloxane+Catalyst (Vi+catalyst emulsion, an reactive emulsion composition comprising 58.00 parts of Water, 39 parts of Dimethyl Siloxane, Dimethylvinylsiloxy-terminated, 1.30 parts of Vinyl Alcohol Polymer with Vinyl Acetate, 0.53 parts of Tetramethyldivinyldisiloxane Complexes (Platinum) catalyst) to the diluted by water; and mixing it again.

Evaluation Conditions:
(i) Substrate: 50 um corona pre-treated PET film;
(ii) Mayer Bar: #6 or #3 (using standardized Coating Bar);
(iii) Silicone coated film cure at oven setting at 160° C./60 sec or 170° C./60 sec.

Evaluation of Rub-Off Resistance of Cured Layer to the Substrate:
(i) Each of two samples, Coat weight (C/W) were tested by XRF (Coat weight (C/W): Use Lab-X3500 instrument to detect the coat weight of silicone. Use uncoated PET as blank. Refer to FINAT Test Method No. 7 (FINAT Technical Handbook 7th edition, 2005)) (XRF: Lab-X3500

X-ray Fluorescence Spectrometer (XRF) manufactured by Oxford Instruments PLC, Oxon, United Kingdom);
(ii) Coat weight (C/W RO) after rub off (15 cycles, 900 g weight, 30 cycles/min by Elcometer 1720 Abrasion Tester) was tested by XRF;
(iii) RO (%)=average (C/W RO)/(C/W)*100
(i) In similar manner, RO (%) was measured by the samples at initial, after 10 days at Room Temperature (RT), and after 7 days at 70° C. under 90% of humidity.
The results were shown in the following Table 5.

Example 9 (Comparative)

Preparation and Evaluation of WB Silicone Release Coating Composition

In the formulation shown in below Table 2 or 4, the WB silicone release coating composition of Example 9 was prepared by below procedure:
(i) Adding 80 g water to 18 g of Hydrosilylation curable silicone base composition (coating base polymer, 38.00 parts of vinyl functional polydimethyl siloxane which include Q ($SiO_{4/2}$) in siloxane chain, the structure of polymer is represented by average formula of siloxane units; $(M^{Vi})_4 D_n Q$ (In the formula, "$M^{Vi}$" designates vinyldimethylsiloxy unit ($ViMe_2SiO_{1/2}$), "D" designates dimethylsiloxy unit ($Me_2SiO_{2/2}$) and Q designates $SiO_{4/2}$ units binding other four different siloxy units. "n" is a number that provide the viscosity of 130 mPas of the Q-branched polymer) and 2.20 parts of Dimethyl, Methylhydrogen Siloxane, Trimethylsiloxy-terminated) in a beaker;
(ii) Adding 0.2 g of Comparative Anchorage Additive: (Comp AA, Dow-Corning 297 Anchorage Additive, Reaction products of Vinyltriacetoxysilane and Glycidoxypropyltrimethoxysilane in the ratio of 1:1 at weight) and gentle mixing;
(iii) Adding 2 g Vinylsiloxane+Catalyst (Vi+catalyst emulsion, a reactive emulsion composition comprising 58.00 parts of Water, 39 parts of Dimethyl Siloxane, Dimethylvinylsiloxy-terminated, 1.30 parts of Vinyl Alcohol Polymer with Vinyl Acetate, 0.53 parts of Tetramethyl-divinyldisiloxane Complexes (Platinum) catalyst) to the dilution water; and mixing it again.

Evaluation Conditions:
(i) Substrate: 50 um corona pre-treated PET film;
(ii) Mayer Bar: #6 or #3 (using standardized Coating Bar);
(iii) Silicone coated film cure at oven setting at 160° C./60 sec or 170° C./60 sec.

Evaluation of Rub-Off Resistance of Cured Layer to the Substrate:
(i) Each of two samples, Coat weight (C/W) were tested by XRF (Coat weight (C/W): Use Lab-X3500 instrument to detect the coat weight of silicone. Use uncoated PET as blank. Refer to FINAT Test Method No. 7 (FINAT Technical Handbook 7th edition, 2005)) (XRF: Lab-X3500 X-ray Fluorescence Spectrometer (XRF) manufactured by Oxford Instruments PLC, Oxon, United Kingdom);
(ii) Coat weight (C/W RO) after rub off (15 cycles, 900 g weight, 30 cycles/min by Elcometer 1720 Abrasion Tester) was tested by XRF;
(iii) RO (%)=average (C/W RO)/(C/W)*100
(i) In similar manner, RO (%) was measured by the samples at initial, after 10 days at Room Temperature (RT), and after 7 days at 70° C. under 90% of humidity.
(ii) The results were shown in the following Tables 3 and 5.

TABLE 2

| | Release coating A group | | | |
|---|---|---|---|---|
| | Examples | | | |
| | reference | 5 | 9 | 6 |
| Coating Base Polymer | 18 | 18 | 18 | 18 |
| Vi + Catalyst Emulsion | 2 | 2 | 2 | 2 |
| AA No. or Comp AA | — | AA No. 1 0.8 | Comp AA 0.2 | AA No. 2 0.8 |
| Water-(8% bath) | 80 | 80 | 80 | 80 |

AA-No. 1: Anchorage Additive emulsion No. 1 (45% silicone content; Surfactant: PVA)
AA-No. 2: Anchorage Additive emulsion No. 2 (45% silicone content; Surfactant: Polyoxyethylene(23) + (4) Lauryl Ether)
Comp AA; Dow-Corning 297 Anchorage Additive

TABLE 3

| A group rub off evaluation results | | | | | | | | | |
|---|---|---|---|---|---|---|---|---|---|
| 160° C./60 sec #6 bar initial | | | 160° C./60 sec #6 bar RT 10 days | | | 160° C./60 sec #6 bar 70 C./90% Oven aged 7 days | | | |
| C/W | C/W RO | RO % | C/W | C/W RO | RO % | C/W | C/W RO | RO % | Note |
| 0.824 | 0.634 | 77% | 0.760 | 0.090 | 12% | 0.744 | 0.080 | 11% | Reference |
| 0.798 | 0.470 | 59% | 0.822 | 0.724 | 88% | 0.765 | 0.705 | 92% | Example 5 Best anchorage |
| 0.767 | 0.431 | 56% | 0.854 | 0.479 | 56% | 0.710 | 0.453 | 64% | Example 9 Poor anchorage |
| 0.623 | 0.092 | 15% | 0.836 | 0.755 | 90% | 0.756 | 0.420 | 56% | Example 6 Good anchorage |

TABLE 3-continued

A group rub off evaluation results

| 170° C./60 sec #3 bar initial | | | 170° C./60 sec #3 bar 70 C./90% Oven aged 7 days | | | |
|---|---|---|---|---|---|---|
| C/W | C/W RO | RO % | C/W | C/W RO | RO % | Note |
| 0.334 | 0.314 | 94% | 0.349 | 0.085 | 24% | Reference |
| 0.352 | 0.297 | 84% | 0.371 | 0.297 | 80% | Example 5 Best anchorage |
| 0.372 | 0.226 | 61% | 0.379 | 0.195 | 51% | Example 9 Poor anchorage |
| 0.381 | 0.064 | 17% | 0.359 | 0.249 | 69% | Example 6 Good anchorage |

(C/W: Coat weight, tested by XRF; C/W RO: Coat weight after rub off, 15 cycles, 900 g weight, 30 cycles/mn)

TABLE 4

Release coating B group

| | Examples | | | |
|---|---|---|---|---|
| | reference | 7 | 9 | 8 |
| Coating Base Polymer | 18 | 18 | 18 | 18 |
| Vi + Catalyst Emulsion | 2 | 2 | 2 | 2 |
| AA No. or Comp AA | — | AA No. 3 0.4 | Comp AA 0.2 | AA No. 4 0.4 |
| Water-(8% bath) | 80 | 80 | 80 | 80 |

AA No. 3: Anchorage Additive emulsion No. 3 (anchorage additive 100%; 45% silicone content; Surfactant: PVA)
AA No. 4: Anchorage Additive emulsion No. 4 (anchorage additive 100%; 45% silicone content; Surfactant: Polyoxyethylene(23) + (4) Lauryl Ether)
Comp AA; Dow-Corning 297 Anchorage Additive

TABLE 5

B group rub off evaluation results

| 160° C./60 sec #6 bar initial | | | 160° C./60 sec #6 bar RT 10 days | | | 160° C./60 sec #6 bar 70 C./90% Oven aged 7 days | | | |
|---|---|---|---|---|---|---|---|---|---|
| C/W | C/W RO | RO % | C/W | C/W RO | RO % | C/W | C/W RO | RO % | Note |
| 0.616 | 0.526 | 85% | 0.679 | 0.133 | 20% | 0.615 | 0.039 | 6% | Reference |
| 0.782 | 0.631 | 81% | 0.770 | 0.623 | 81% | 0.606 | 0.485 | 80% | Example 7 Best anchorage |
| 0.739 | 0.475 | 64% | 0.705 | 0.428 | 61% | 0.598 | 0.298 | 50% | Example 9 Poor anchorage |
| 0.665 | 0.124 | 19% | 0.629 | 0.459 | 73% | 0.581 | 0.398 | 69% | Example 8 Good anchorage |

| 170° C./60 sec #3 bar initial | | | 170° C./60 sec #3 bar 70 C./90% Oven aged 7 days | | | |
|---|---|---|---|---|---|---|
| C/W | C/W RO | RO % | C/W | C/W RO | RO % | Note |
| 0.202 | 0.148 | 73% | 0.243 | 0.062 | 26% | Reference |
| 0.176 | 0.120 | 68% | 0.205 | 0.123 | 60% | Example 7 Best anchorage |
| 0.190 | 0.112 | 59% | 0.182 | 0.053 | 29% | Example 9 Poor anchorage |
| 0.231 | 0.061 | 26% | 0.230 | 0.120 | 52% | Example 8 Good anchorage |

INDUSTRIAL APPLICABILITY

With said curable composition according to the present invention, a release-coated liner and laminated structure comprising the released coated liner can be obtained. The industrial applicability covers almost all potential use of release-coated liners, F\for example, release liner for label, tape, adhesive for electronic, adhesive or tape for sanitary & medical, bakery and steam food and sheet for heat moulding release, die cutting & temporary carry

The invention claimed is:
1. A silicone release coating composition comprising:
    (X1) a silicone emulsion comprising:
        (A) 0.1 to less than 80.0 parts by weight of a silicone compound comprising an anchorage additive for enhancing the adhesion to a polymer film substrate, wherein the anchorage additive is the reaction product of (A1) a fluid polyorganosiloxane containing at least one alkenyl group and at least one silanol group with (A2) a hydrolysable silane containing at least one epoxide group;

(B) 0.1 to less than 20.0 parts by weight of at least one surfactant, wherein component (B) comprises at least one nonionic surfactant selected from the group consisting of polyether compounds, polyether-modified silicones, water-soluble polyester compounds, water-soluble polyvinyl alcohols, and water-soluble polyvinylacetate; and (C) 5.0 to 99.8 parts by weight of water; and (X2) at least one curable silicone composition.

2. The silicone release coating composition according to claim 1, wherein the fluid polyorganosiloxane (A1) is a copolymer of methylvinylsiloxane units and dimethylsiloxane units, and has a degree of polymerisation of at least 4 and up to 50 siloxane units with terminal silanol groups.

3. The silicone release coating composition according to claim 2, wherein component (A1) has a degree of polymerisation of at least 6 and up to 30 siloxane units.

4. The silicone release coating composition according to claim 1, wherein the hydrolysable silane (A2) is an (epoxy-substituted alkyl) di- or tri-alkoxy silane.

5. The silicone release coating composition according to claim 1, wherein the silicone compound is a mixture of the anchorage additive and (A3) at least one silicone selected from the group consisting of a polyorganosiloxane having at least one alkenyl group, a polyorganosiloxane having at least one alkoxy group, a polyorganosiloxane having at least one epoxy group, a polyorganosiloxane having at least one Si-bonded hydrogen atom, and silicone resins in the ratio of 100:0 to 20:80 by weight.

6. The silicone release coating composition according to claim 1, wherein component (B) comprises at least two nonionic surfactants selected from the group consisting of polyether compounds, polyether-modified silicones, water-soluble polyester compounds, water-soluble polyvinyl alcohols, and water-soluble polyvinylacetate.

7. The silicone release coating composition according to claim 1, wherein the droplets of the silicone emulsion (X1) have an average particle size of less than 1 μm, as measured by a laser diffraction/dispersion method for emulsion particles.

8. The silicone release coating composition according to claim 1 wherein component (X2) is a water-based hydrosilylation reaction curable silicone composition.

9. A cured release coating-bearing sheet-form substrate yielded by curing the silicone release coating composition according to claim 1 in the form of a thin film on a sheet-form substrate.

10. The cured release coating-bearing sheet-form substrate according to claim 9, wherein the sheet-form substrate is glassine paper, clay-coated paper, polyolefin-laminated paper, thermoplastic resin film, or metal foil.

11. A method of producing a cured release coating-bearing sheet-form substrate, said method comprising the steps of:
applying a silicone release coating composition on at least one side of a sheet-form substrate to form a film; and
curing the film at a temperature of at least 100° C.;
wherein the silicone release coating composition is as set forth in claim 1.

12. The method according to claim 11, wherein component (X2) of the silicone release coating composition is a water-based hydrosilylation reaction curable silicone composition.

13. The method according to claim 11, wherein the sheet-form substrate is glassine paper, clay-coated paper, polyolefin-laminated paper, thermoplastic resin film, or metal foil.

14. A silicone release coating composition comprising:
(X1) a silicone emulsion comprising:
(A) 0.1 to less than 80.0 parts by weight of a silicone compound comprising an anchorage additive for enhancing the adhesion to a polymer film substrate, wherein the anchorage additive is the reaction product of (A1) a fluid polyorganosiloxane containing at least one alkenyl group and at least one silanol group with (A2) a hydrolysable silane containing at least one epoxide group;
(B) 0.1 to less than 20.0 parts by weight of at least one surfactant; and
(C) 5.0 to 99.8 parts by weight of water; and
(X2) at least one curable silicone composition;
wherein the droplets of the silicone emulsion (X1) have an average particle size of less than 1 μm, as measured by a laser diffraction/dispersion method for emulsion particles.

15. The silicone release coating composition according to claim 14, wherein the fluid polyorganosiloxane (A1) is a copolymer of methylvinylsiloxane units and dimethylsiloxane units, and has a degree of polymerisation of at least 4 and up to 50 siloxane units with terminal silanol groups.

16. The silicone release coating composition according to claim 14, wherein the hydrolysable silane (A2) is an (epoxy-substituted alkyl) di- or tri-alkoxy silane.

17. The silicone release coating composition according to claim 14, wherein the silicone compound is a mixture of the anchorage additive and (A3) at least one silicone selected from the group consisting of a polyorganosiloxane having at least one alkenyl group, a polyorganosiloxane having at least one alkoxy group, a polyorganosiloxane having at least one epoxy group, a polyorganosiloxane having at least one Si-bonded hydrogen atom, and silicone resins in the ratio of 100:0 to 20:80 by weight.

18. The silicone release coating composition according to claim 14, wherein component (X2) is a water-based hydrosilylation reaction curable silicone composition.

19. A cured release coating-bearing sheet-form substrate yielded by curing the silicone release coating composition according to claim 14 in the form of a thin film on a sheet-form substrate, optionally wherein the sheet-form substrate is glassine paper, clay-coated paper, polyolefin-laminated paper, thermoplastic resin film, or metal foil.

20. A method of producing a cured release coating-bearing sheet-form substrate, said method comprising the steps of:
applying a silicone release coating composition on at least one side of a sheet-form substrate to form a film; and
curing the film at a temperature of at least 100° C.;
wherein the silicone release coating composition is as set forth in claim 14.

* * * * *